United States Patent
Nielsen et al.

(10) Patent No.: US 6,325,933 B1
(45) Date of Patent: Dec. 4, 2001

(54) PROCESS FOR BIOLOGICAL PURIFICATION OF WASTE WATER UNDER SLUDGE RETENTION

(75) Inventors: Marinus Nielsen, Virum; Claus Poulsen Dahl, Brønshøj, both of (DK)

(73) Assignee: Krüger A/S, Søborg (DK)

( * ) Notice: Subject to any disclaimer, the term of this patent is extended or adjusted under 35 U.S.C. 154(b) by 0 days.

(21) Appl. No.: 09/508,637
(22) PCT Filed: Sep. 16, 1998
(86) PCT No.: PCT/DK98/00395
  § 371 Date: May 9, 2000
  § 102(e) Date: May 9, 2000
(87) PCT Pub. No.: WO99/16716
  PCT Pub. Date: Apr. 8, 1999

(30) Foreign Application Priority Data
Sep. 16, 1997 (DK) .................................. 1063/97

(51) Int. Cl.$^7$ ................ C02F 3/18; C02F 3/30; B01D 21/00
(52) U.S. Cl. ............ 210/605; 210/624; 210/626; 210/628; 210/195.3; 210/202; 210/205; 210/219
(58) Field of Search ................ 210/605, 608, 210/623, 624, 626, 628, 629, 630, 195.1, 195.3, 201, 202, 205, 219, 220, 906, 926

(56) References Cited

U.S. PATENT DOCUMENTS

| | | | |
|---|---|---|---|
| 2,324,593 | * | 7/1943 | Persson et al. . |
| 2,492,486 | * | 12/1949 | Kivari et al. . |
| 2,875,151 | * | 2/1959 | Davidson . |
| 3,547,814 | * | 12/1970 | McWhirter . |
| 3,735,870 | * | 5/1973 | Uden . |
| 3,977,965 | | 8/1976 | Tholander et al. . |
| 4,056,465 | * | 11/1977 | Spector . |
| 4,136,023 | * | 1/1979 | Kirk et al. . |
| 4,221,656 | * | 9/1980 | Kennedy . |
| 4,284,510 | | 8/1981 | Savard et al. . |
| 4,301,007 | | 11/1981 | Savard et al. . |
| 4,315,821 | * | 2/1982 | Climenhage . |
| 4,457,844 | | 7/1984 | Beard . |
| 4,487,692 | * | 12/1984 | Kersten . |
| 4,500,429 | * | 2/1985 | Reimann et al. . |
| 4,786,413 | | 11/1988 | Reimann et al. . |
| 4,917,805 | * | 4/1990 | Reid . |
| 5,811,011 | * | 9/1998 | Ciszczon et al. . |

FOREIGN PATENT DOCUMENTS

| | | |
|---|---|---|
| 3500340 | 7/1986 | (DE) . |
| 4109815 | 10/1992 | (DE) . |
| 0191483 | 8/1986 | (EP) . |

* cited by examiner

Primary Examiner—David A. Simmons
Assistant Examiner—Fred Prince
(74) Attorney, Agent, or Firm—Dykema Gossett PLLC

(57) ABSTRACT

A process for biological purification of waste water by the activated sludge method wherein the waste water is continuously passed through one or more treatment zones and a clarification zone, wherein the waste water treated in the last treatment zone at the outlet from the zone under suitable control of aeration and stirring is continuously divided into a predominantly aqueous fraction and a sludge-containing fraction, and wherein a portion of the sludge fraction is recirculated and mixed with non-treated waste water, of which the former is subjected to clarification, and the latter is recirculated to the same or a preceding treatment zone.

6 Claims, 4 Drawing Sheets

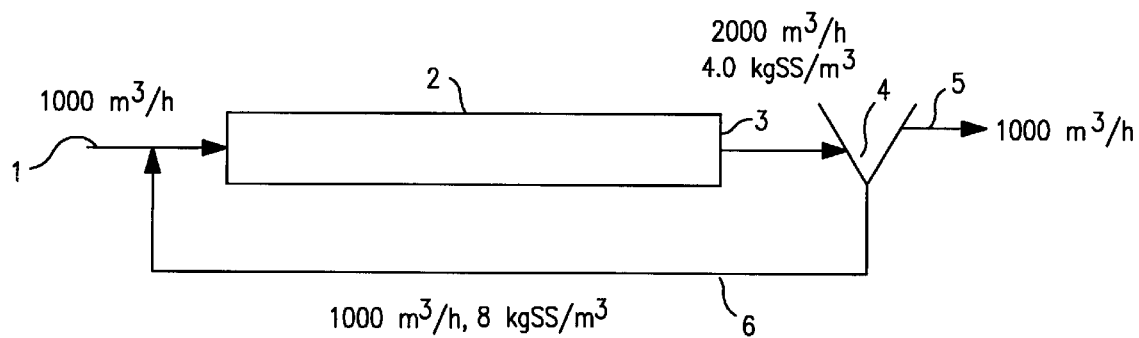
FIG. 1
PRIOR ART
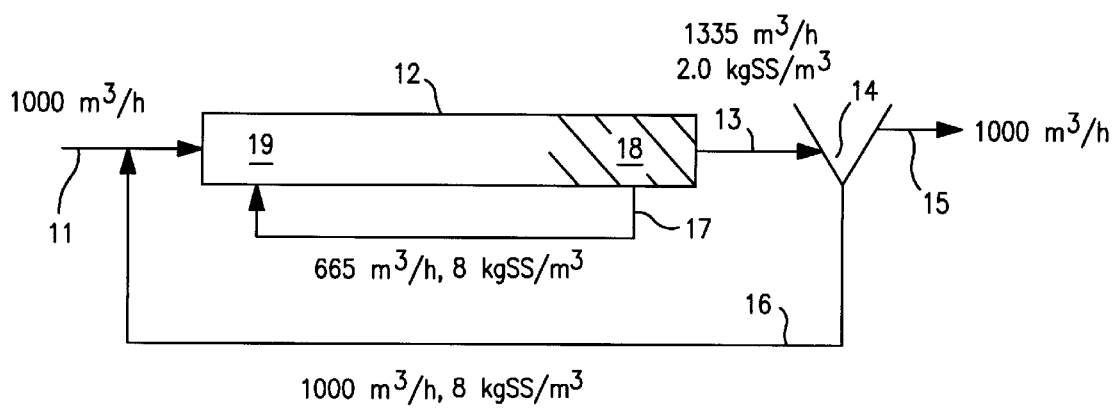
FIG. 2
 Aerobic    Stratification

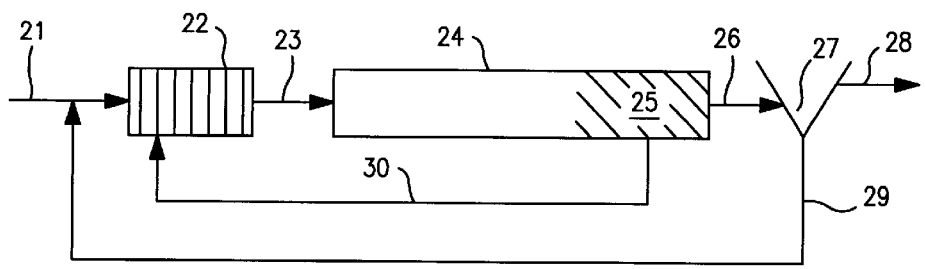
FIG. 3
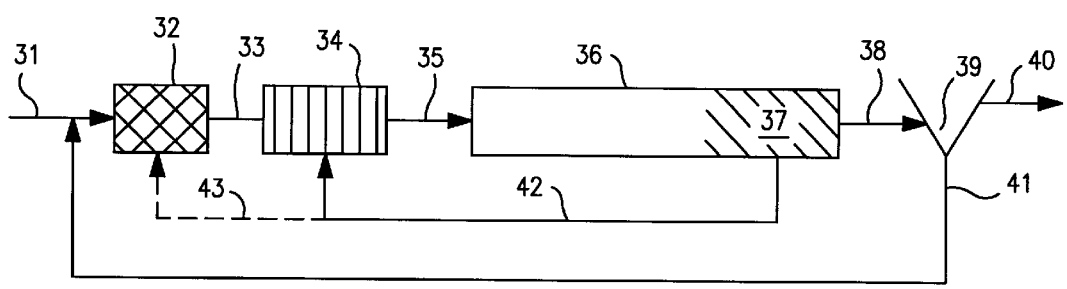
FIG. 4
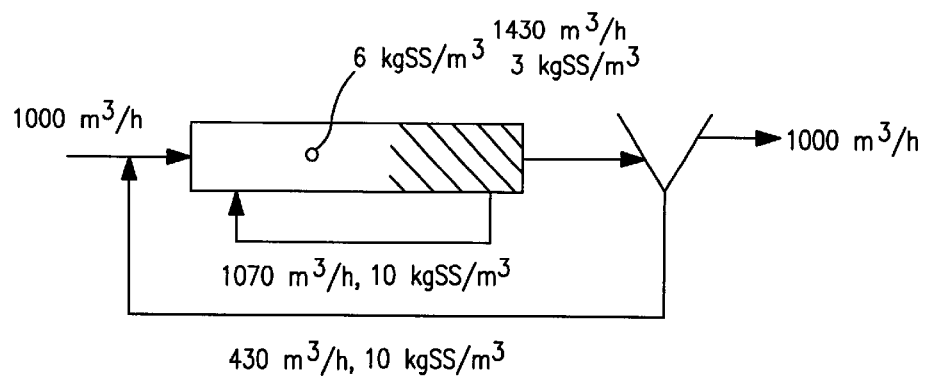
FIG. 5

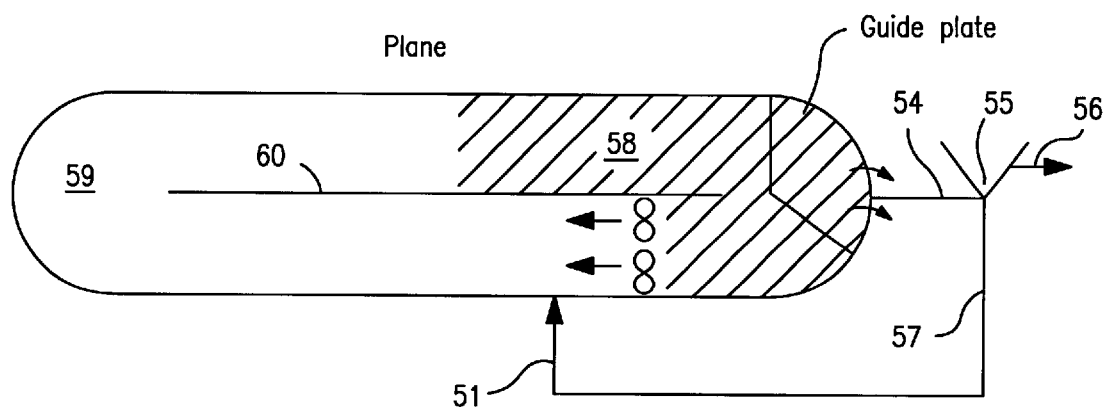
FIG. 6
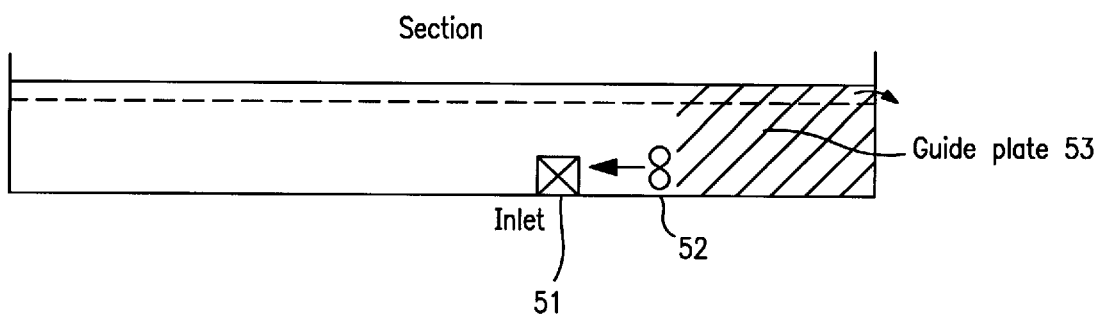
FIG. 7
 Aerobic    Stratification

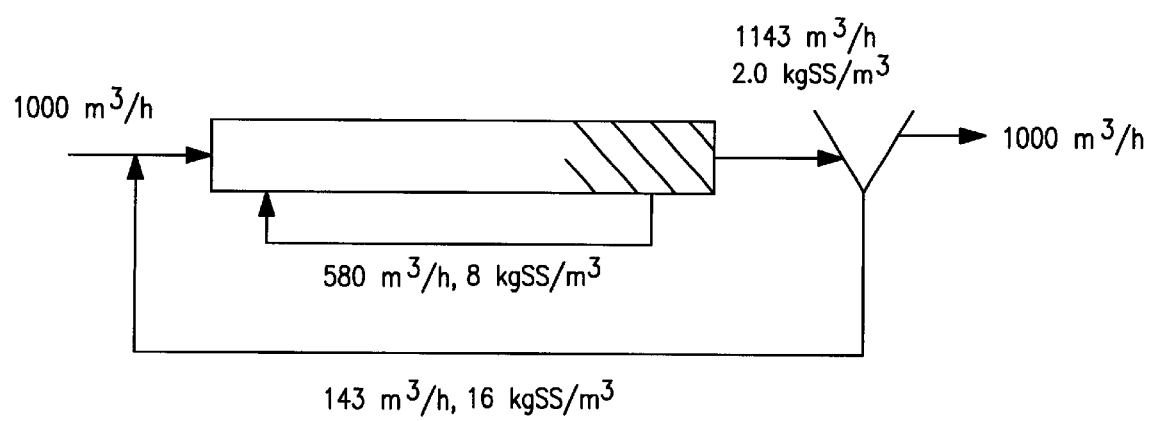
FIG. 8

PROCESS FOR BIOLOGICAL PURIFICATION OF WASTE WATER UNDER SLUDGE RETENTION

BACKGROUND OF THE INVENTION

1. Field of the Invention

The invention relates to a process for biological purification of waste water by the activated sludge method, whereby the waste water is passed continuously through one or more treatment zones and a clarification zone for division of the treated waste water into a water fraction and a sludge fraction, and whereby a portion of the sludge fraction is recirculated and mixed with non-treated waste water.

2. The Prior Art

It is known that the efficiency of a biological purification of waste water by the activated sludge method increases with increasing amounts of sludge in the treatment zones, and that in order to obtain high sludge concentrations it has been necessary to employ high sludge recirculation ratios, i.e., high ratios of sludge, which is recirculated from the clarification zone to the first treatment zone, to the amount of non-treated waste water.

However, the large amount of sludge causes problems in case of increased supply of water, e.g., in case of heavy showers. In such a case the amount of sludge in the clarification tank will start increasing due to overload, which ultimately entails that the sludge is entrained out into the recipient with resultant pollution hereof.

It has therefore been attempted to find a way in which it is possible, perhaps temporarily in case of peak loads, to reduce the load on the clarification tank, so that the situation described above is avoided.

Bent Tholander has described a method which is based on a basic module formed of a continuously aerated tank and two side tanks with alternating function as aeration tanks or clarification tanks, where the waste water is always supplied to the centre tank. If two such modules are connected, a system is obtained which in case of particularly heavy showers can be adjusted, so that two clarification tanks are in operation.

PCT-application No. PCT/DK95/00309 (WO 96/02468) discloses a method of obtaining high sludge concentrations without using high sludge recirculation ratios by maintaining for a period such conditions in one or more treatment zones that sludge precipitation occurs herein, and by passing, in a succeeding period, a mixture of non-purified waste water and recirculated sludge to the zone which in the preceding period served as sludge precipitation zone.

By using the above mentioned method it has been possible to increase the sludge concentration in the treatment zone from 4 to about 5.9 kg/m$^3$ and to reduce the sludge recirculation ratio from 1.0 to 0.5, which has resulted in a reduction of the load on the clarification tank from about 8.000 kg/h to about 3.000 kg/h.

In practice, the method described above presupposes that at least two, and preferably four, separate tanks and a clarification tank be used for treating the waste water.

This entails comparatively high costs for the construction and operation of water purification plants in which the method described above can be used.

DE 3 601 669 discloses a method where purification of waste water takes place in one undivided tank with several treatment zones, all with stirring, characterized by different oxygen concentrations. The method is based on the presence of carrier particles which make it possible to mechanically separate the purified waste water by means of a sieve device.

However, use of such a carrier material is associated with difficulties in the form of providing and removing it.

U.S. Pat. No. 4,457,844 discloses a method for the purification of waste water where a portion of the waste water flow is passed into an oxidation tank with an internal clarification device with inlet in the rear end and openings for sludge withdrawal at the bottom. The purified waste water is returned to the non-purified waste water flow.

Plants operated by this method will, however, be restricted by the physical shape of the clarification device, and their capacity thus cannot be extended no matter whether the need might change. Besides, the clarification may turn out to be inadequate, and means have not been provided for succeeding, extra clarification.

EP 191 483 discloses a method for biological aerobic treatment of waste water where the aeration of the waste water is adjusted proportionally to the hydraulic load on the plant, and where a gravimetric separator mechanically separates off and automatically returns sludge.

However, there is no post-clarification of the purified waste water, and consequently no change in the clarification capacity in the plant.

EP 30 485 discloses a method for biological treatment of waste water which takes place in one single tank which is divided into a reaction zone at the bottom of the tank, and an overlying clarification zone. The non-purified waste water is mixed with a recirculated flow which is withdrawn at the bottom of the tank. The mixture is aerated by means of an external air lift device, and is then returned to the tank. Purified waste water is withdrawn via an overflow at the top of the tank.

This method only allows short residence time in the external air lift, for which reason there is risk that the aeration gets unsatisfactory. In addition, the construction of the tank offers no possibility of increasing the capacity in case of peak loads.

DE 35 00 340 discloses a method for biological purification of waste water, where the waste water is passed through two stages from which sludge is mechanically separated off and recirculated.

The problem with plants operated by this method is that, as is the case for several of the plants already mentioned, in case of peak loads the required flexibility is not available. For example, it is not possible to employ more aeration capacity, should need arise.

SUMMARY OF THE INVENTION

The process according to the invention is characterized in that the waste water treated in the last treatment zone, at the outlet from the zone under suitable control of aeration and stirring is continuously divided into a predominantly aqueous fraction and a sludge-containing fraction, of which the former is subjected to clarification, and the latter is recirculated to the same or a preceding treatment zone.

By continuously separating a heavily sludge-containing fraction from the treated waste water, and by recirculating it to the inlet end of the tank, a relatively high sludge concentration and consequently an increased purification efficiency are obtained in the tank, simultaneously with the sludge recirculation ratio and the sludge load on the clarification tank being reduced.

A similar effect is obtained by passing the recirculated sludge-containing fraction to some point situated between the inlet end and the zone in which the waste water is divided.

The process according to the invention thus provides a flexible system being adaptable to situations with large amounts of water as well as situations with heavily polluted waste water. If the waste water is particularly concentrated, the aeration capacity and consequently the biological purification capacity can be increased, while in case of heavy showers, e.g., if there are signs of overload on the clarification tank, it is possible at the outlet end of the tank to control aeration and stirring in a suitable manner and thereby obtain a stratification in the last part of the zone, so that the waste water is divided into an predominantly aqueous fraction and a sludge containing-fraction.

The expressions "predominantly aqueous fraction" and "sludge-containing fraction" should here be taken to mean two fractions of which the former contains only a negligent amount of sludge corresponding to a concentration of 1–4 $kgSS/m^3$, preferably 2–3 $kgSS/m^3$, and the latter is highly sludge-containing, corresponding to a concentration of 6–12 $kgSS/m^3$, preferably 8–10 $kgSS/m^3$.

The separation hereof can be effected in various ways. For example, the division can be obtained by disposing a horizontal guide plate at the outlet end at a suitable depth, so that a stratification of water and sludge already achieved is underpinned, and is not destroyed when withdrawing the predominantly aqueous fraction in the region over the guide plate, and when withdrawing the highly sludge-containing fraction in the region under the guide plate.

Division can e.g. also be obtained by using an uncomplicated overflow, which retains the heavily sludge-containing waste water at the bottom, and allows the purified waste water at the top to pass.

In the following the invention is described in more detail with reference to the drawings.

BRIEF DESCRIPTION OF THE DRAWINGS

FIG. 1 shows a conventionally operated plant for the purification of waste water with a treatment zone and a clarification zone.

FIG. 2 shows a plant for the purification of waste water operated by the process according to the invention with a treatment zone and a clarification zone.

FIG. 3 shows a plant for the purification of waste water operated by the process according to the invention with several treatment zones.

FIG. 4 shows another plant for the purification of waste water operated by the process according to the invention with several treatment zones.

FIG. 5 shows a purification plant operated by the process according to the invention.

FIG. 6 shows an example of use of the process according to the invention with an annular channel as process tank.

FIG. 7 shows a vertical section of the process tank according to FIG. 6.

FIG. 8 shows an exemplary calculation.

DETAILED DESCRIPTION OF THE PREFERRED EMBODIMENT

FIG. 1 illustrates a conventional plant that includes an inlet 1 into an aerobic process tank 2, from where a conduit 3 leads to a clarification tank 4, from where again there is an outlet 5, and a recirculation conduit 6 which leads back to the inlet 1.

By this type of conventional operation the waste water is passed into the process tank 2, where aeration and stirring are performed along the full length of the tank so as to obtain approximated complete mixing. The outlet from the process tank 2 to the clarification tank 4 consequently has a concentration corresponding to the process concentration in the tank, for example 4 $kgSS/m^3$, which again means that a large amount of sludge is carried over into the clarification tank. As a result, a comparatively large clarification tank and a high recirculation ratio are required in order to maintain the sludge concentration in the process tank.

FIG. 2 illustrates a plant for carrying out a method according to the invention, with an inlet 11 which leads into an aerobic process tank 12, from where a conduit 13 proceeds to a clarification tank 14, from where again there is an outlet 15, and a recirculation conduit 16 which leads back to the inlet 11. In addition, from the outlet end 18 a recirculation conduit 17 leads back to the inlet end 19.

By controlling aeration and stirring a stratification is obtained at the outlet end of the process tank. As a result, there is a concentration at the top of the tank which is smaller than the average concentration in the tank. The flow which is withdrawn from here to the clarification tank thus has a lower concentration of for example 2 $kgSS/m^3$, which reduces the load on the clarification tank.

During the stratification period, sludge is accumulated at the outlet end of the tank, wherefore the up-concentrated sludge in the stratified zone is pumped out at the bottom and back to the inlet end of the process tank. As the amount of sludge which is carried over into the clarification tank is clearly reduced, it is thus possible to maintain a process concentration of 4 $kgSS/m^3$ in the tank by using a smaller clarification tank.

FIG. 3 shows an inlet 21 which leads to an anoxic tank 22, from where a conduit 23 proceeds to an aerobic process tank 24, from where again a conduit 26 proceeds to a clarification tank 27 having an outlet 28. From the clarification tank 27, recirculation is effected via a conduit 29 to the inlet 21, just as from the outlet end 25 of the process tank recirculation is effected via a conduit 30 to the anoxic tank 22.

In this embodiment an anoxic zone has thus been introduced before the process tank, where nitrate in the presence of micro-organisms is converted into free nitrogen (denitrification), and to which the recirculated return sludge from the stratified zone is passed. The sludge load on the clarification tank is still low as a result of the method described under FIG. 2.

FIG. 4 shows an inlet 31 which leads into an anaerobic tank 32, from where a conduit 33 proceeds to an anoxic tank 34, from where again a conduit 35 proceeds to an anaerobic process tank 36 with an outlet end 37, from where a conduit 38 leads to a clarification tank 39, and a recirculation conduit 42, the latter leading back to the anoxic tank 34. From the clarification tank 39 there is an outlet 40 and a recirculation conduit 41, the latter leading back to the inlet 31. The recirculation conduit 42 can optionally be extended by the conduit section 43, so that recirculation is also effected to the anaerobic tank 32.

This illustrates a purification plant operated by a process according to the invention, where additionally an anaerobic zone is introduced in order to obtain biological phosphorous removal and/or selector effect, which entails an improved sludge as regards precipitation properties. At the same time the possibility of dividing the recirculation flow is outlined, so that sludge is returned from the stratified zone to both the anoxic and the anaerobic zone.

FIG. 5 shows a special embodiment of the process according to the invention, which is described in more detail in example 2.

FIGS. 6 and 7 show an example of use of the process according to the invention with an annular channel as process tank. This is obtained by an inlet 51 into an anaerobic process tank 59 divided by a partition 60 with an outlet end 58 with a guide plate 53 for dividing the waste water. From here a pipe 54 leads to a clarification tank 55, from where there is an outlet 56 and a recirculation pipe 57, the latter leading back to the inlet 51. At least one stirrer or aerator 52 is placed at the inlet. The direction of flow is indicated by arrows at the stirrers.

By controlling aeration and stirring in the last part of the annular channel, a stratification is obtained corresponding to the examples described above. At the outlet a flow is consequently withdrawn which has lower sludge concentration than the average concentration in the process tank. In order to ensure this lower concentration, a guide plate can, as shown in the figure, be inserted, which gives a better separation of the sludge.

Experimentally, the introduction of the guide plate has turned out to reduce the sludge concentration in the outlet from the tank by additionally 33%.

After the outlet, the concentrated sludge is mixed with the inlet flow by means of the stirrers or aerators shown, whereby the upconcentrated sludge is recirculated as a result of the internal flow in the annular channel.

In the following the invention is illustrated in more detail by way of the examples below.

COMPARATIVE EXAMPLE (CONVENTIONAL OPERATION)

When operating a purification plant as shown in FIG. 1 there is, by way of experience, a concentration of suspended substance (SS) of 8 $kgSS/m^3$ in the return flow 6 from the clarification tank 4, which means, as compared with an assumption that overall in the process tank 2 there is a concentration of 4 $kgSS/m^3$ at approximated complete mixing, that an amount of flow (here 1000 $m^3/h$) corresponding to 100% (recirculation ratio=1.0) should be recirculated in order to maintain a concentration of 4 $kgSS\ m^3$ in the process tank. This requires that twice the amount of flow (2000 $m^3/h$) must be passed through the conduit 3 from the process tank to the clarification tank in order to obtain a suitable return flow and maintain the process concentration of 4 $kgSS/m^3$. This entails a load on the clarification tank of 8000 kgSS/h.

Example 1

FIG. 2 shows an embodiment of the process according to the invention. Because of the stratification in the outlet end of the tank with resultant precipitation of sludge, there is a sludge concentration of 2.0 kg $kgSS/m^3$ in the outlet from the tank. As a result of this low concentration the return sludge flow via the conduit 16 can be significantly reduced. However, there is upconcentrated sludge at the outlet end, for which reason at internal recirculation, sludge is discharged at the bottom through the conduit 17 and passed back to the inlet end 19. If these return sludge flows are controlled to the effect that the aggregate return flow equals the return flow at conventional operation, a sludge load is obtained, as shown, of 2670 kgSS/h as compared with 8000 kgSS/h at conventional operation (FIG. 1). By keeping the energy costs for recirculation of sludge constant, a reduction by 67% of the sludge load on the clarification is thus obtained in this first embodiment of the process according to the invention.

Example 2

FIG. 5 shows an embodiment of the process according to the invention, where the plant is designed to obtain a higher sludge concentration in the process tank as well as a reduction of the sludge load on the clarification tank.

In order to obtain a better plant capacity, a process concentration of 6 $kgSS/m^3$ in the tank has been chosen here. Since by the process according to the invention, as described above, a stratification is obtained at the outlet end of the tank, the concentration in the outlet is also in this case lower, corresponding to the 3 $kgSS/m^3$. If the aggregate return flow is set at 1500 $m^3/h$, a sludge load on the clarification tank of 4290 kgSS/h is obtained, as shown. Thus, as compared with conventional operation (FIG. 1) there is here an additional cost for recirculation of 50% additional return sludge. In return, a higher purification capacity is obtained due to the possibility of operating with a higher process concentration, the load on the clarification tank simultaneously being reduced by 46%.

Example 3

FIG. 8 shows an embodiment of the process according to the invention where the aggregate recirculation (723 $m^3/h$) as compared with conventional operation is reduced by 28%. At the same time, the load on the clarification tank is restricted as only 2286 kgSS/h pass, which should be seen in relation to the 8000 kgSS/h at conventional operation (FIG. 1). This form for operation is, however, only feasible if the capacity of the clarification tank so permits as, in order to maintain the high starting concentration in the recirculation flow from the clarification tank, it is necessary either to operate with a long residence time in a comparatively large tank, or to use a large part of the clarification tank as sludge storage.

What is claimed is:

1. A process for biological purification of waste water comprising the steps of:

(a) providing a mixture of non-treated waste water and sludge and continuously supplying said mixture into an inlet end of an aerobic treatment zone which has an inlet end and an outlet end, (b) aerating and stirring said mixture in said aerobic treatment zone so as to provide a water-rich fraction and a sludge-rich fraction as said mixture moves toward said outlet end, (c) passing said water-rich fraction from said aerobic treatment zone to a clarification zone wherein said water-rich fraction is separated into a water fraction and a sludge fraction, (d) recirculating a portion of said sludge fraction from step (c) to form the mixture in step (a), (e) recovering said water fraction from step (c), and (f) recirculating a portion of said sludge-rich fraction at said outlet end of said aerobic treatment zone to said inlet end.

2. A process for biological purification of waste water comprising the steps of:

(a) providing a mixture of non-treated waste water and sludge and continuously supplying said mixture to at least one anoxic treatment zone wherein said mixture is denitrified, (b) passing said denitrified mixture to an inlet end of an aerobic treatment zone which has an inlet end and an outlet end, (c) aerating and stirring said denitrified mixture in said aerobic treatment zone so as to provide a water-rich fraction and a sludge-rich fraction as said mixture moves toward said outlet end, (d) passing said water-rich fraction from said aerobic treatment zone to a clarification zone wherein said water-rich fraction is separated into a water fraction and a sludge fraction, (e) recirculating a portion of said sludge fraction from step (d) to form said mixture in step (a), (f) recovering said water fraction from step (d), and (g) recirculating a portion of said sludge-rich fraction at said outlet end of said aerobic treatment zone to said at least one anoxic treatment zone.

3. A process for biological purification of waste water comprising the steps of:

(a) providing a mixture of non-treated waste water and sludge and continuously supplying said mixture to at least one anaerobic treatment zone so as to remove phosphorus from said mixture and improve precipitation of said sludge, (b) passing said mixture from step (a) to at least one anoxic treatment zone wherein said mixture is denitrified, (c) passing said denitrified mixture to an inlet end of an aerobic treatment zone which has an inlet end and an outlet end, (d) aerating and stirring said denitrified mixture in said aerobic treatment zone so as to provide a water-rich fraction and a sludge-rich fraction as said mixture moves toward said outlet end, (e) passing said water-rich fraction from said aerobic treatment zone to a clarification zone wherein said water-rich fraction is separated into a water fraction and a sludge fraction, (f) recirculating a portion of said sludge fraction from step (e) to form the mixture in step (a), (g) recovering said water fraction from step (e), and (h) recirculating a portion of said sludge-rich fraction at said outlet end of said aerobic treatment zone to said at least one anoxic treatment zone.

4. A process according to claim 3, including a step (i) of recirculating a portion of said sludge-rich fraction at said outlet end of said aerobic treatment zone to said anaerobic treatment zone.

5. An apparatus for biological purification of waste water which comprises:

an elongated annular channel treatment tank which defines an inlet end and an outlet end and in which a mixture of waste water and sludge can be aerated and stirred as said mixture moves from said inlet end to said outlet end, said treatment tank including a horizontal guide plate at said outlet end for dividing said aerated and stirred mixture into an upper water-rich fraction and a lower sludge-rich fraction, a first flow line for supplying a mixture of waste water and sludge to said inlet end of said treatment tank, a clarifier device for clarifying said water-rich fraction into a water fraction and a sludge fraction, a second flow line for delivering said water-rich fraction from said treatment tank to said clarifier device, a third flow line for recirculating a portion of said sludge fraction to said first flow line, and a fourth flow line for removing said water fraction from said clarifier device.

6. An apparatus according to claim 5, including a stirrer in said elongated annular-channel treatment tank at said inlet end thereof.

\* \* \* \* \*